(12) United States Patent
Basol et al.

(10) Patent No.: US 7,316,602 B2
(45) Date of Patent: Jan. 8, 2008

(54) CONSTANT LOW FORCE WAFER CARRIER FOR ELECTROCHEMICAL MECHANICAL PROCESSING AND CHEMICAL MECHANICAL POLISHING

(75) Inventors: Bulent M. Basol, Manhattan Beach, CA (US); Jalal Ashjaee, Cupertino, CA (US); Konstantin Volodarsky, San Francisco, CA (US)

(73) Assignee: Novellus Systems, Inc., San Jose, CA (US)

( * ) Notice: Subject to any disclaimer, the term of this patent is extended or adjusted under 35 U.S.C. 154(b) by 478 days.

(21) Appl. No.: 10/654,542

(22) Filed: Sep. 2, 2003

(65) Prior Publication Data

US 2004/0112760 A1 Jun. 17, 2004

Related U.S. Application Data

(63) Continuation of application No. 10/155,828, filed on May 23, 2002.

(60) Provisional application No. 60/407,449, filed on Aug. 30, 2002.

(51) Int. Cl.
*B24B 1/00* (2006.01)
(52) U.S. Cl. ......................... 451/41; 451/288
(58) Field of Classification Search ................... 451/41, 451/285, 287, 288, 398
See application file for complete search history.

(56) References Cited

U.S. PATENT DOCUMENTS

| | | | |
|---|---|---|---|
| 5,423,716 A | 6/1995 | Strasbaugh | |
| 5,916,015 A | 6/1999 | Natalicio | |
| 6,080,050 A | 6/2000 | Chen et al. | |
| 6,203,414 B1 * | 3/2001 | Numoto et al. | 451/288 |
| 6,231,428 B1 * | 5/2001 | Maloney et al. | 451/41 |
| 6,443,824 B2 | 9/2002 | Shendon et al. | |
| 6,447,379 B1 | 9/2002 | Gromko et al. | |
| 6,663,466 B2 * | 12/2003 | Chen et al. | 451/8 |
| 6,857,945 B1 * | 2/2005 | Chen et al. | 451/288 |
| 6,921,323 B2 * | 7/2005 | Boo et al. | 451/288 |
| 6,976,903 B1 * | 12/2005 | Williams | 451/8 |
| 2001/0000775 A1 * | 5/2001 | Zuniga et al. | 451/398 |
| 2001/0044268 A1 * | 11/2001 | Shendon | 451/285 |
| 2002/0115397 A1 * | 8/2002 | Kajiwara et al. | 451/398 |

* cited by examiner

*Primary Examiner*—Eileen P. Morgan
(74) *Attorney, Agent, or Firm*—Knobbe, Martens, Olson & Bear, LLP

(57) ABSTRACT

A carrier head for holding a workpiece during processing of a workpiece surface is provided. The carrier head includes a carrier housing, a base and a pressure member. The base is configured to hold the workpiece and is movable with respect to the carrier housing. The pressure member is between the base and the carrier housing and is configured to induce the base to apply a predetermined force onto the process surface.

25 Claims, 4 Drawing Sheets

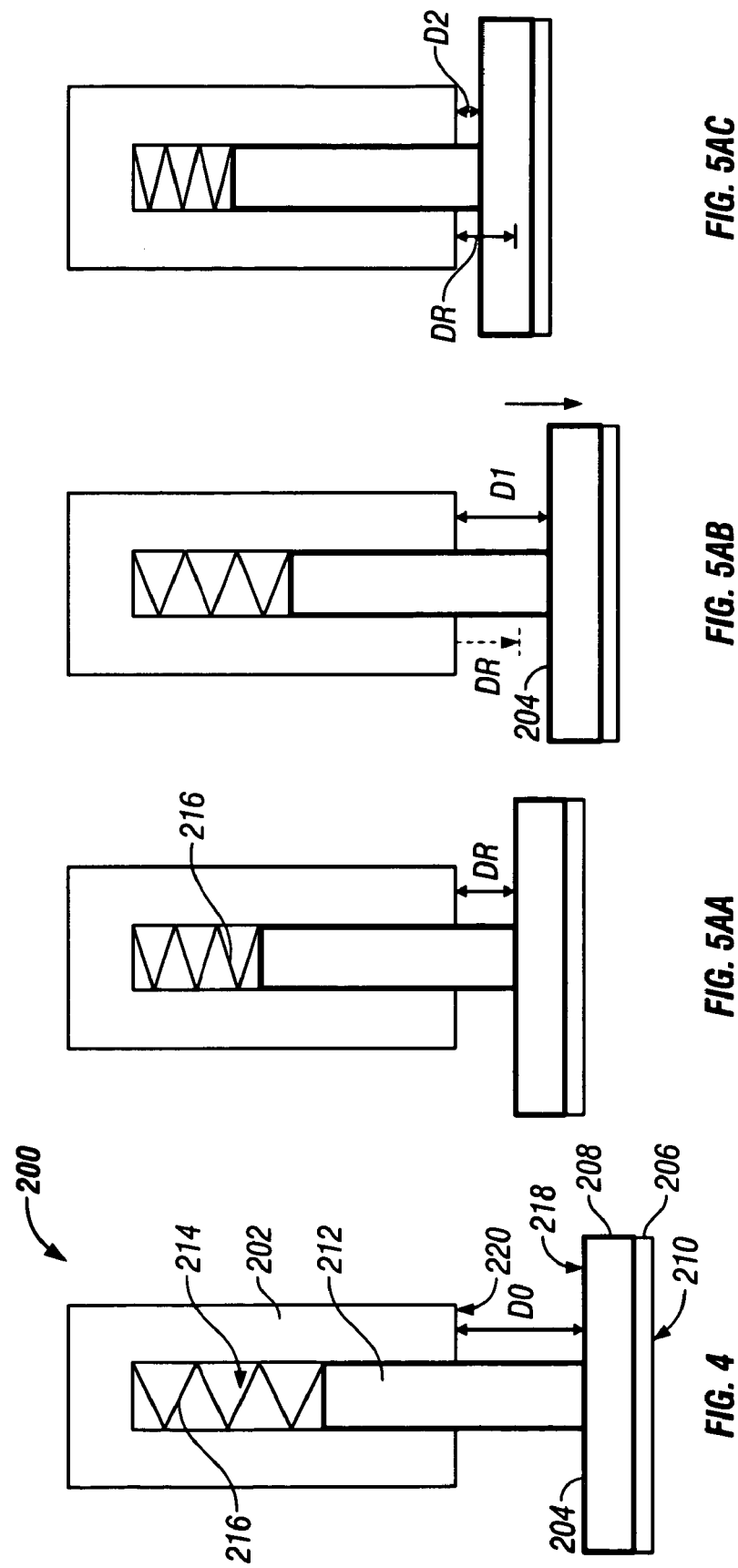

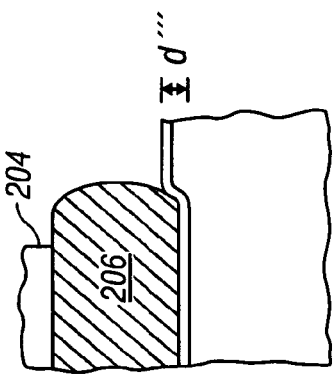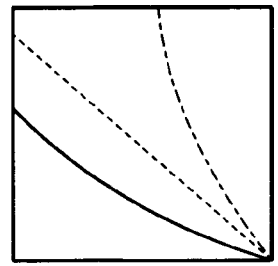
FIG. 6AC    FIG. 7AC
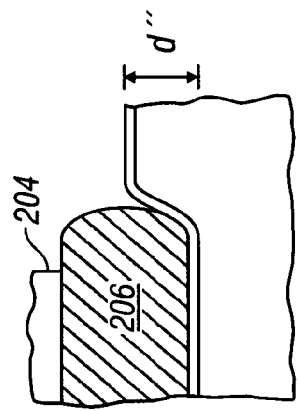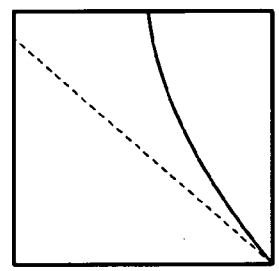
FIG. 6AB    FIG. 7AB
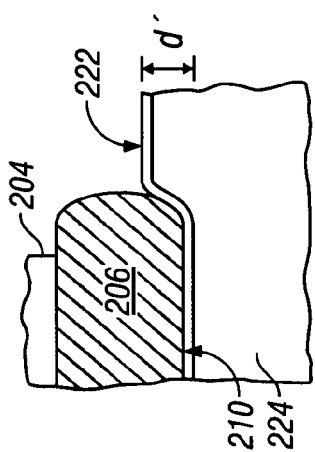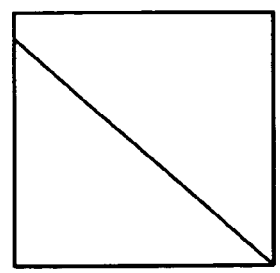
FIG. 6AA    FIG. 7AA

CONSTANT LOW FORCE WAFER CARRIER FOR ELECTROCHEMICAL MECHANICAL PROCESSING AND CHEMICAL MECHANICAL POLISHING

RELATED APPLICATIONS

This application claims the priority of U.S. Ser. No. 10/155,828 filed May 23, 2002 (NT-226) and prior U.S. provisional application 60/407,449, filed Aug. 30, 2002, all incorporated herein by reference.

FIELD

The present invention relates generally to semiconductor integrated circuit manufacturing technology and, more particularly, to processing apparatus and processing techniques such as electroplating, electroetching and chemical mechanical polishing that are applied to a workpiece surface.

BACKGROUND OF THE INVENTION

Conventional semiconductor devices generally include a semiconductor substrate, such as a silicon substrate, and a plurality of sequentially formed dielectric interlayers such as silicon dioxide and conductive paths or interconnects made of conductive materials. Copper and copper alloys have recently received considerable attention as interconnect materials because of their superior electro-migration and low resistivity characteristics. The interconnects are usually formed by filling copper in features or cavities etched into the dielectric layers by a metallization process. The preferred method of copper metallization is electroplating. In an integrated circuit, multiple levels of interconnect networks laterally extend with respect to the substrate surface. Interconnects formed in sequential layers can be electrically connected using vias or contacts.

In a typical process, first an insulating layer is formed on the semiconductor substrate. Patterning and etching processes are performed to form features such as trenches and vias in the insulating layer. Then, barrier and seed layers are deposited in the features and on the surface regions between the features formed. Afterwards, a conductor such as copper is electroplated to fill all the features. However, the plating process results in a thick copper layer on the substrate, some of which need to be removed before the subsequent step. Conventionally, after the copper plating, CMP process is employed to globally planarize and then reduce the thickness of the copper layer down to the level of the surface of the barrier layer, which is also later removed. CMP is a costly and time consuming process that reduces production efficiency. High pressures used in the CMP processes also damage low-k dielectrics that have less mechanical strength than silicon oxide.

The adverse effects of conventional material removal technologies may be minimized or overcome by employing an Electrochemical Mechanical Processing (ECMPR) approach that has the ability to provide thin layers of planar conductive material on the workpiece surface, or even provide a workpiece surface with no or little excess conductive material. This way, CMP process can be minimized or even eliminated. The term of Electrochemical Mechanical Processing (ECMPR) is used to include both Electrochemical Mechanical Deposition (ECMD) processes as well as Electrochemical Mechanical Etching (ECME), which is also called Electrochemical Mechanical Polishing (ECMP). It should be noted that in general both ECMD and ECME (or ECMP) processes are referred to as electrochemical mechanical processing (ECMPR) since both involve electrochemical processes and mechanical action on the workpiece surface.

Descriptions of various planar deposition and planar etching or polishing methods i.e. ECMPR approaches and apparatus, can be found in the following patents and pending applications, all commonly owned by the assignee of the present invention: U.S. Pat. No. 6,126,992 entitled "Method and Apparatus for Electrochemical Mechanical Deposition," U.S. Pat. No. 6,534,116 entitled "Plating Method and Apparatus that Creates a Differential Between Additive Disposed on a Top Surface and a Cavity Surface of a Workpiece Using an External Influence," filed on Dec. 18, 2001, and U.S. Application filed on Sep. 20, 2001 with Ser. No. 09/961,193 entitled "Plating Method and Apparatus for Controlling Deposition on Predetermined Portions of a Workpiece". U.S. Application with Ser. No. 09/960,236 filed on Sep. 20, 2001, entitled "Mask Plate Design," and U.S. Application with Ser. No. 10/155,828 filed on May 23, 2002, entitled "Low Force Electrochemical Mechanical Processing Method and Apparatus," both assigned to the same assignee as the present invention. These methods can deposit metals in and over cavity sections on a workpiece in a planar manner. They also can remove material in a planar manner.

FIG. 1 shows an exemplary ECMPR system 10, which includes a workpiece-surface-influencing device (WSID) 12 such as a mask, pad or a sweeper, a carrier head 14 holding a workpiece 16 such as a wafer, and an electrode 17 immersed in a process solution 18. The process solution 18 is contained in a process container 19. The wafer can be a silicon wafer to be plated with copper using the ECMPR system or it can be a copper plated wafer to be processed for material removal using the ECMPR approach such as ECME or ECMP. The WSID 12 is used during at least a portion of the ECMPR when there is physical contact and relative motion between a surface 20 of the wafer 16 and the top surface 22 of the WSID 12. During ECMPR, a top surface 22 of the WSID sweeps the surface 20 of the wafer 16 while an electrical potential is applied between the electrode 17 and the surface of the wafer. Alternately, in some cases potential is established right after WSID surface 22 sweeps the surface 20 of the wafer. In other words establishment of the potential and sweeping of the substrate surface by the WSID do not have to be simultaneous or continuous as described in detail in previous applications cited above. Channels 24 of the WSID allow the process solution 18 such as a copper plating electrolyte, an electropolishing electrolyte or a polishing solution to flow to the surface of the wafer. It should be noted that the electrode 17 may be placed at other locations in the system as long as it is physically contacted by the process solution. The potential to the wafer surface may be applied through contacts of various designs such as contacts at the edge of the wafer or over substantially the whole surface of the wafer. Process solution may be fed onto the WSID from the top and flow through the channels 24, i.e. the flow direction may be reverse of what is shown in FIG. 1. The process solution may be delivered through a supply inlet 27 in the container 19. Different WSID materials and designs maybe used. In one example, the WSID is basically composed of a top layer 28, which is preferably made of a flexible film, and a compressible layer 30 that is made of a spongy or otherwise compressible material. The top layer 28 and the compressible layer 30 may themselves be composite layers, i.e. they may consist of one or more layers of different materials. The top layer 28 may be an abrasive film. The WSID is supported by a support plate 32, which is porous, or otherwise has a set of openings to direct the process solution towards the surface of the workpiece surface through the WSID structure.

If the ECMD process is carried out to plate a conductor such as copper onto the wafer in the ECMPR system of FIG. 1, the surface of the wafer is wetted by a deposition electrolyte, which is also in fluid contact with an electrode (in this case an anode), such as electrode 17 shown in FIG. 1. A potential is applied, by a power supply 36, between the surface of the wafer and the electrode 17 rendering the wafer surface cathodic. If the ECME process is carried out, the surface of the wafer is wetted by the deposition electrolyte or a special etching/polishing electrolyte, which is also in fluid contact with an electrode (this time the cathode) and a potential is applied between the surface of the wafer and the electrode rendering the wafer surface anodic. Thus material removal takes place from the wafer surface also assisted by the mechanical action of the WSID.

The ECMPR systems are capable of performing planar or non-planar plating as well as planar or non-planar material removal. If non-planar process approach is chosen, the front surface of a wafer is brought near the top flexible layer of the WSID, but it does not touch it, so that non-planar metal deposition can be performed. Further, if planar process approach is chosen, the front surface of the wafer contacts the top flexible layer, at least during a portion of the process period, as a relative motion is established between the top layer and the wafer surface. As an electrolyte solution is delivered through the channels of the WSID, the wafer is moved, i.e., rotated and preferably also laterally moved, while the front surface contacts the flexible layer. Under an applied potential between the wafer and an electrode, and in the presence of the process solution, the metal such as copper, is plated on or removed from the front surface of the wafer depending on the polarity of the voltage applied between the wafer surface and the electrode. During the process, the wafer surface is pushed against the surface of the WSID or vice versa at a pressure range of about 0.1-2 psi, preferably at a range of 0.1-1 psi, at least part of the time when the surface of the workpiece is swept by the WSID. Planar deposition is achieved due to this sweeping action as described in the above-cited patents and patent applications. It should be noted that even higher pressures may be applied to the substrate surface by the WSID in applications where high stress does not cause damage on the surface of the substrate. It should also be noted that although the invention is described as it is applied to manufacturing of interconnects on wafers, it is applicable to all cases where cavities on a substrate is filled with a planar conductor material. Although a specific WSID structure is given to describe the invention, the invention is applicable to any WSID design or structure as long as the WSID is used to contact the workpiece surface during at least some portion of the material deposition or removal process.

The amount of force that is applied on the wafer during ECMPR affects the characteristics, especially the surface characteristics of the processed layer. This physical contact needs to be uniform and repeatable for best results for material deposition as well as material removal. For example, during planar deposition of copper layers, if the wafer is pushed against the top flexible layer, the force on the wafer is increased as the compressible layer is compressed more and more toward the support layer. For many compressible layer materials, the force exerted onto the wafer surface increases roughly linearly as the wafer is pushed into the WSID from a 'zero-touch' position in which the wafer surface just touches the WSID surface, to a process depth that a process is carried out. For example, for a selected compressible layer material with certain spring constant, pushing the wafer into a process depth of 0.5 mm may apply an average force of 0.3 psi onto the wafer surface. Increasing the process depth to 1 mm may increase the force to approximately 0.6 psi. For other materials this relationship may not be linear but it may show a sub-linear or super-linear behavior. In any case, it can be appreciated from the above discussion that the stability of the ECMPR over hundreds or thousands of wafers may require knowledge of the "zero-touch" position, the amount of push or displacement by the wafer surface into the WSID, or the force applied onto the wafer surface.

In one prior art method, the touch position is determined during the set-up of the ECMPR equipment after installation of a new WSID or any time a change is made in the set-up that may have affected the zero-touch position. The touch position can be determined, for example, by placing a thin (typically 1-4 mils thick) sheet between the wafer surface and the WSID. The gap between the wafer surface and the WSID is then gradually reduced through commands to the z-motion controller and z-motion motor typically at 0.1 mm increments. As the wafer surface is brought closer and closer to the WSID surface the thin sheet in between the two surfaces is continually moved. When the zero-touch position is reached the sheet cannot be easily moved any more indicating that the WSID surface is pushed against the wafer surface. This procedure is time consuming and not necessarily very accurate. Another prior art method involves monitoring of the torque of the motor that moves the carrier head 14 in FIG. 1. As the wafer surface is brought closer and closer to the WSID surface, the torque suddenly increases when the two surfaces touch. The 'z' position at this instant is the zero-touch position.

Once the zero-touch position is determined and recorded, the ECMPR recipe then commands a vertical, or z-motion controller of the wafer holder 14 to push the wafer into the WSID during the process, by a fixed amount, or depth, relative to this recorded zero-touch value, the amount of displacement corresponding to the desired level of force on the wafer surface. There are, however, drawbacks in this approach. For example, during processing of plurality of wafers with the same WSID, the compressible layer of the WSID may swell or shrink due to exposure to the process solutions, and this may cause the "z" position of the WSID surface to change in time from the value set during the initial set up, which in turn may result in wafer to wafer variations in zero touch position. Soaking of the compressible layer 30 in process solution for long periods of time may also change the spring constant of this layer. In other words the force applied to the wafer surface may not be the same for the same displacement or push value after the WSID is soaked in the process solution. Also, if the WSID is replaced, the height of the WSID or the distance between the WSID and the wafer surface may change due to the possible thickness variation from batch to batch of the compressible layer of the WSID. This may result in variations in zero touch positions for the wafers processed before and after the replacement. Such variations in the zero touch position may result in changes in the force that is exerted on the wafers during the process. Furthermore, changes in the properties of the compressible layer or the top layer of the WSID may result in changes in the force applied to the wafer surface even for the same displacement of the wafer surface into the WSID structure. Such process non-uniformity is not desirable in the semiconductor industry. To this end, there is need for an improved method and apparatus for applying a predetermined constant force to the surface of substrates during planar metal electrochemical mechanical deposition or electro-etching.

SUMMARY OF THE INVENTION

The present invention provides a method and apparatus for a constant force carrier head. The constant force carrier head is used for processing a surface of a wafer using a workpiece surface influencing device and comprise a workpiece holder having a shaft and configured to hold the wafer and a shaft housing having a biasing mechanism configured to receive the shaft of the workpiece holder wherein the biasing mechanism urges the workpiece holder against the workpiece surface influencing device to process the surface of the wafer. Since the amount of force that is applied on the wafer during processing affects the characteristics, especially the surface characteristics of the processed layer, the constant force carrier head maintains a constant force during processing for uniform and repeatable results.

According to another aspect of the invention, the shaft housing includes a shaft cavity configured to receive the shaft of the workpiece holder. The shaft is urged by the biasing mechanism and will move accordingly to adjust the workpiece holder to maintain a constant force against the workpiece surface influencing device.

According to yet another aspect of the invention, the shaft cavity includes bearings to minimize friction between the shaft of the workpiece holder and the shaft cavity as the shaft moves within the shaft cavity.

According to another embodiment of the invention, the biasing mechanism includes a shaft spring located within the shaft housing. The shaft spring has a spring constant that is less than a spring constant of the workpiece influencing device.

According to yet another embodiment of the invention, the shaft housing and the shaft of the workpiece holder are rotatably coupled to rotate as a single unit. Similarly, the shaft housing and the shaft may move, as a unit, horizontally with relation to the workpiece influencing device.

According to another embodiment of the invention, a flexible diagram is coupled to the shaft of the workpiece holder and the shaft housing. Other advantages of the present invention are disclosed with reference to the drawings and the description that follows.

BRIEF DESCRIPTION OF THE DRAWINGS

FIG. 4 is a schematic illustration of a wafer carrier when it is in no-touch position;

FIG. 5AA is a schematic illustration of a first position of the wafer carrier shown in FIG. 4 during a first stage of an exemplary touch processing;

FIG. 5AB is a schematic illustration of a second position the wafer carrier during a second stage of the exemplary touch processing;

FIG. 5AC is a schematic illustration of a third position the wafer carrier during a third stage of the exemplary touch processing;

FIG. 6AA is a schematic illustration of a position of the wafer surface during the first stage of the exemplary touch processing;

FIG. 6AB is a schematic illustration of a position of the wafer surface against the surface of a workpiece surface influencing device (WSID) during the second stage of the exemplary touch processing;

FIG. 6AC is a schematic illustration of a position of the wafer surface against the surface of a workpiece surface influencing device (WSID) during the third stage of the exemplary touch processing;

FIG. 7AA is a graph illustrating the relation ship between the force applied upon a WSID and the distance that wafer surface travels into the WSID with that force during the first stage of the exemplary touch processing;

FIG. 7AB is a graph illustrating the relation ship between the force applied upon the WSID and the distance that wafer surface travels into the WSID with that force during the second stage of the exemplary touch processing; and FIG. 7AC is a graph illustrating the relation ship between the force applied upon the WSID and the distance that wafer surface travels into the WSID with that force during the third stage of the exemplary touch processing;

DETAILED DESCRIPTION OF PREFERRED EMBODIMENTS

Constant low force carrier head of the present invention applies a selected constant force or pressure to a surface of a wafer during ECMD or ECMP processes. However, the carrier head of the present invention can also be used for a chemical mechanical polishing (CMP) system to polish work-pieces using a pre-selected force or pressure during the CMP process. During an ECMD or ECMP operation, if the compressibility characteristics of the WSID changes, the process depth 'd' needs to change to keep the force on the wafer constant. The low force carrier head of the present invention compensates for these changes by automatically adjusting its displacement along the z-axis. Due to the predetermined substantially constant force provided by a spring attached to a wafer holder portion of the carrier, the force applied by the wafer holder, in the new process depth, remains substantially constant.

Figure 1:
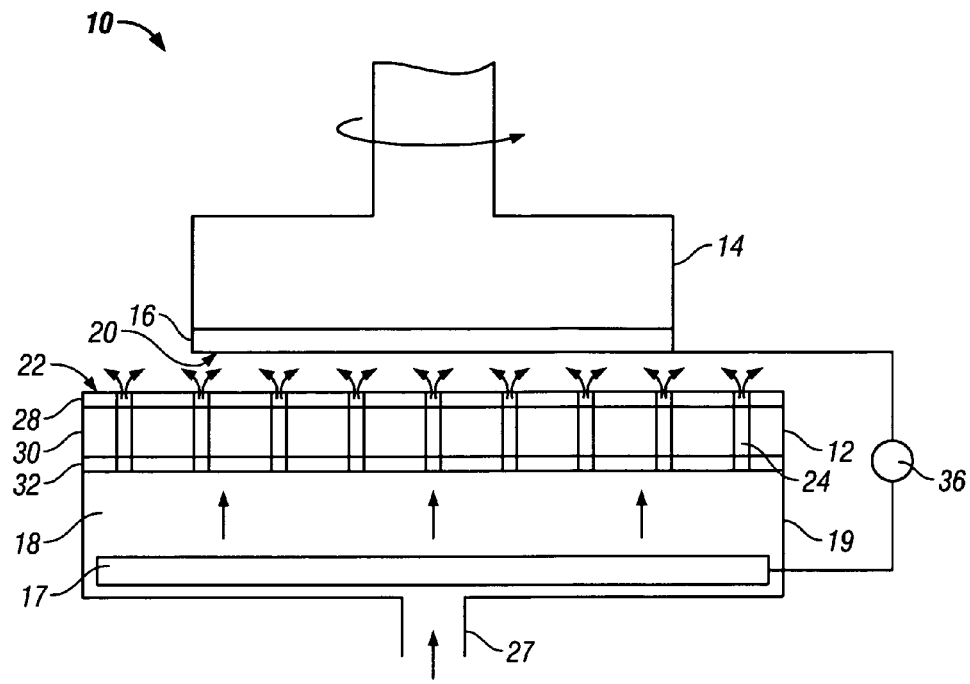
FIG. 1 is a schematic illustration of an exemplary Electrochemical Mechanical Processing System.
Figure 2:
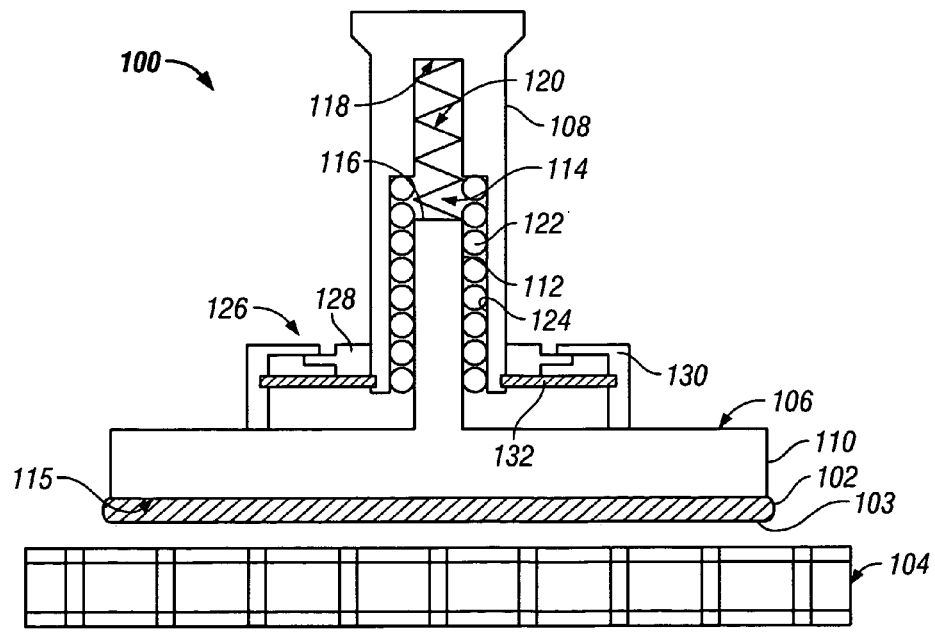
FIG. 2 is a schematic illustration of an embodiment of a carrier head of the present invention.

FIG. 2 shows a constant low force carrier head 100 of the present invention for electrochemical mechanical processing a workpiece such as a wafer 102 using a workpiece surface influencing device (WSID) 104. The carrier head 100 of the present invention is generally comprised of a holder 106 or sub carrier and a shaft housing 108. The holder 106 comprises a holder base 110 and a shaft 112 which is movably inserted into a cavity 114 of a shaft housing 108. The shaft may be an integral part of the holder base 110 or it may be attached to it. The holder base 110 is preferably circular if the workpiece is a round wafer and the shaft 112 extends along the rotational axis of the circular base. The wafer is placed and held on a base surface 115 so that a front surface 103 of the wafer is fully exposed. The base may include various features such as vacuum or pressure lines (not shown) and the surface 115 may include features such as sealing members (not shown) and ports (not shown) for the lines. There may be a retaining ring (not shown) around the wafer periphery as is commonly used in CMP applications. Such features help to retain a wafer on the base surface 115 while exposing the front surface 103 of the wafer 102 to the process environment. Between an upper end 116 of the shaft 112 and a distal end 118 of the cavity 114 is a pressure member, such as a spring 120 with a known spring constant. Linear bearings 122, such as ball bearings, placed on the walls 124 of the cavity 114 enable the shaft 112 to move vertically, thereby moving the holder 106 vertically with respect to the housing 108. Bearings 122 are used to minimize or practically eliminate friction between the shaft 112 and the housing 108 while maintaining constant down force applied by the spring 120 against the WSID surface during processing of the wafer. This also enables the holder 106 to rapidly respond to any changes in the WSID during the process. In this configuration, the spring constant of the spring 120 is selected such that it only allows a pre-selected constant force to be exerted by the holder or the wafer surface onto the WSID surface. This pre-selected force may be less than 1 psi. Although use of replaceable springs is most preferable, functions provided by the spring may alternatively be provided by a tightly controlled pneumatic system or just by the weight of the holder. In the latter case, a holder with predetermined weight is used without any spring or pneumatic control. This way the weight or the force is distributed. If springs are used, they can be easily replaced with other springs to obtain a large range of process force or pressure values.

Lower end 126 of the housing 108 may include a stop ring 128 which may touch a limiting ring 130 of the holder 106 when the holder is in its lowest vertical position or when a no-touch process is carried out as shown in FIG. 2. A diaphragm 132, preferably circular, attaches the lower end 126 of the housing to the holder 106 through the limiting ring 130. The diaphragm is made of a flexible material such as rubber. When the housing 108 is rotated by a motor, this motion is coupled to the holder 106 through the diaphragm 132. The flexible diaphragm, while allowing coupling of rotational movement from the housing to the holder 106, does not appreciably interfere with the vertical motion of the holder 106 and it does not appreciably change the force applied by the spring during operation.

Figure 3:
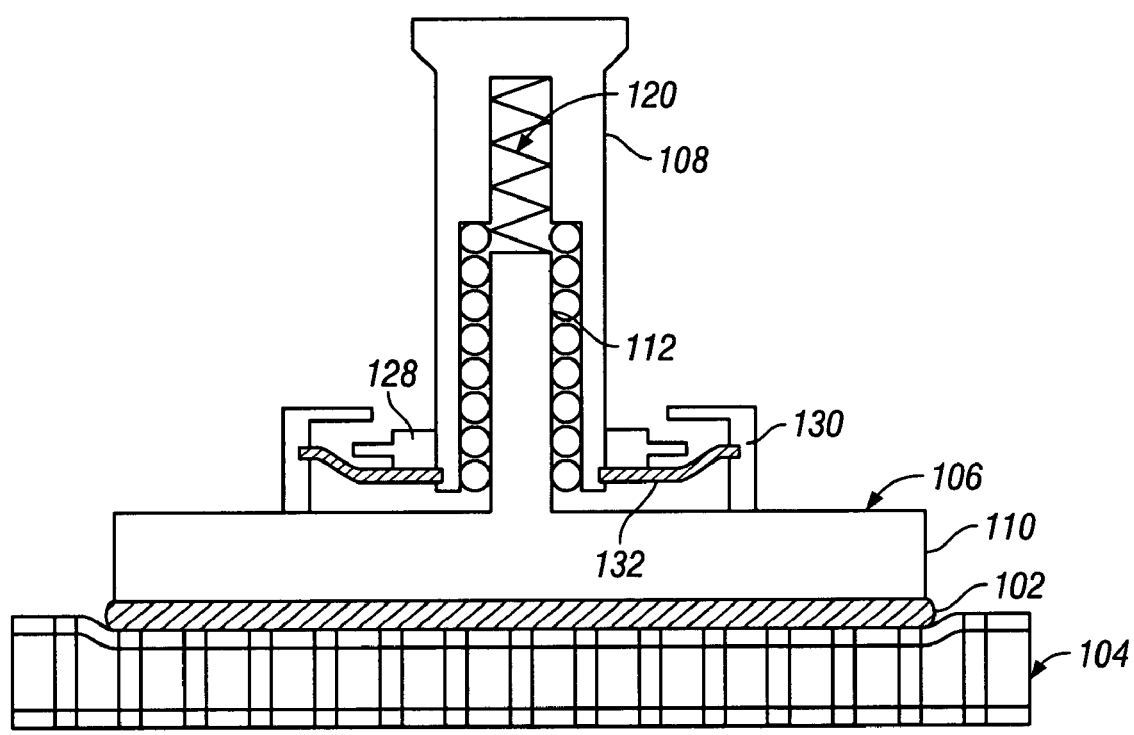
FIG. 3 is a schematic illustration of a touch processing of a wafer on a process surface using the carrier head shown in FIG. 2.

As illustrated in FIG. 3, during a process step that involves physical contact between the wafer surface and WSID (touch process), the head 100 is moved towards the WSID. After the surface of the wafer held by the holder touches the WSID surface, the housing 108 is moved further down. As the shaft housing 108 is moved down, the stop ring 128 disengages from the limiting ring 130 allowing the predetermined force of the spring to be applied to the WSID surface by the wafer and vice versa. It should be noted that the force applied by the spring causes a process depth 'd' in the WSID. The 'd' value is a function of the compressibility of the WSID and the force applied by the holder. During the operation, if the compressibility characteristics of the WSID changes, the 'd' value automatically changes since the force applied by the spring is substantially constant. The holder compensates these changes by adjusting its displacement along the z-axis by easily moving up or down due to the presence of linear bearings 122. However, due to the predetermined constant force provided by the spring attached to the holder, the force applied by the holder does not change. It should be noted that the spring constant of the WSID is selected to be higher than the spring constant of the spring. It is also preferred that 'd' value is less than 2 mm, preferably less than 1 mm. There may be a screw (not shown) at the top of the housing 108 to pre-compress the spring 120, which is a compression spring. In cases where the weight of the holder 110 may be large, a tension spring may be used to balance this weight and provide low force against the WSID surface.

FIGS. 4-5AC in connection with FIGS. 6AA-6AC and FIGS. 7AA-7AC exemplify the functioning of one of the embodiments of the present invention. In FIGS. 4 to 5AC, in order to better describe the functionalities of the low force carrier head of the present invention and for the purpose of clarity, the low force carrier head is simplified.

FIG. 4 exemplifies a low force carrier head 200 having a shaft housing 202 and a holder 204 holding a wafer 206 on a holder base so that front surface 210 of the wafer 206 is fully exposed. The holder base is attached to a holder shaft 212 that is movably inserted into a cavity 214 of the housing 202. A spring 216 attaches the shaft to a distal end of the cavity 214. The spring determines the force that is applied by the holder. In this example, displacement value will be exemplified as the distance between an upper surface 218 of the base 208 and the lower end 220 of the housing 202. In FIG. 4, the holder is in no-touch position. At no-touch position, the spring is in a first state and the holder has a displacement value D0. The first state of the spring 216 is a predetermined state, which is determined by use of stop and limiting rings shown in FIG. 2.

FIG. 5AA in connection with FIG. 6AA shows a first stage of an exemplary touch process with reference displacement distance DR and the initial process depth d' as the holder 204 compresses surface 222 of a WSID 224 by pushing the wafer 206 to process depth d'. In comparison to the no touch process step, the spring at the first stage of the touch process is in a more compressed state, which will be referred to as a second state. During a first stage of a touch process using the WSID 224, the relationship between the process depth d' and a selected applied force is near linear. For a predetermined constant force applied on the WSID, a corresponding constant process depth, or process depth d', is obtained throughout the first stage. FIG. 7AA shows an exemplary force-distance relationship for the WSID 224 during the first stage of the process for various forces that can be applied by changing springs.

FIG. 5AB in connection with FIG. 6AB shows a second stage of the touch process using the WSID 224 for an extended period of time. Extended use may change the compressibility characteristics of the WSID and as shown in FIG. 7AB, the relationship between the force applied by the holder and the corresponding distance, or process depth may no longer be linear as indicated by the solid curve. For the predetermined force level, the process depth may need to be higher, indicating softening of the WSID structure with extended exposure to process solutions or other process conditions. However, in response to increasing process depth (from d' to d") of the WSID, as shown in FIG. 5AB, the holder 204 moves away from the reference displacement distance DR to D1 with the increasing process depth while still applying the predetermined force value to the wafer 206 during the second stage of the touch process. With the increasing displacement value, in comparison to first stage, the spring 216 is in somewhat more extended state, or a third state. It should be noted that D1-DR=d"-d'.

FIG. 5AC in connection with FIG. 6AC shows a third exemplary stage of the touch process using the WSID 224 for an extended period of time. As in the second stage, extended use affects the compressibility characteristics of the WSID. As shown in FIG. 7AC, the relationship between the force applied by the holder and the corresponding distance, or process depth may no longer be linear but it may change as shown by the solid curve. For the predetermined force level, the process depth d''' may be lower, indicating hardening of the WSID with extended exposure to process solutions or other process conditions. However, in response to decreasing process depth of the WSID, as shown in FIG. 5AC, the holder 204 reduces its displacement distance to D2 value with the decreasing process depth while still applying the predetermined force value to the wafer 206 during the third stage of the touch process. With the decreasing displacement value, in comparison to previous stages, the spring 216 is in a more compressed state, or a fourth state. It should be noted that d''-d'''=D1-D2. The spring is used in its linear range.

As previously mentioned above, the constant low force carrier head of the present invention can also be used in a CMP system to process wafers with chemical mechanical polishing process. By changing the springs or adjusting the compressibility characteristics of a spring, different force or pressures can be used during the CMP process. The head of the present invention can be for example used with linear CMP systems using a linear polishing pad or belt to polish wafers, and can also be used with rotary CMP systems using a rotary pad to polish wafers. The constant low force head can be used with the reverse linear CMP system disclosed in U.S. Pat. No. 6,103,628, entitled Reverse Linear Polisher with Loadable Housing, which is commonly owned by the assignee of the present invention. In this case, the polishing pad surface is pushed against the wafer surface by pressure generated by a fluid such as air. When this force exceeds the force of the spring in the head, the head moves away from the original position of the polishing pad, keeping the force constant.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A carrier for processing a surface of a workpiece using a process surface, comprising:
    a carrier housing;
    a base configured to hold the workpiece and movable with respect to the carrier housing; and
    a single pressure member between the base and the carrier housing, the pressure member configured to apply a single force to the base and to move an entirety of the base with respect to the carrier housing to cause the base to apply the force onto the process surface, wherein a spring constant of the process surface is greater than a spring constant of the pressure member.

2. The carrier of claim 1, wherein the pressure member includes a spring.

3. The carrier of claim 1, wherein the pressure member is a compressed fluid controlled by a pneumatic system.

4. The carrier of claim 1, wherein the process surface is a surface of a workpiece surface influencing device.

5. The carrier of claim 1, wherein the process surface is a surface of a polishing pad.

6. The carrier of claim 1, wherein:
    the carrier housing includes a cavity; and
    the base includes a shaft configured to slide within the cavity.

7. The carrier of claim 6, wherein the pressure member attaches the base to the carrier housing, the pressure member being within the cavity.

8. The apparatus of claim 6, wherein the cavity includes bearings to minimize friction between the shaft of the base and the carrier housing as the shaft moves within the cavity.

9. The carrier of claim 1, wherein the carrier housing includes a stop member and the shaft of the base includes a limiting member configured to mate with the stop member when the pressure member moves the shaft beyond a travel limit range of the base relative to the carrier housing.

10. The apparatus of claim 9, wherein the pressure member is configured to cause the base to exert substantially a same force against the process surface throughout the travel limit range of the base.

11. The apparatus of claim 1, wherein the carrier housing and the base are rotatably coupled to rotate as a single unit.

12. The apparatus of claim 11 further comprising a flexible diaphragm coupled to the base and the carrier housing.

13. A method for processing a semiconductor wafer using a constant force carrier head comprising the steps of:
    holding the semiconductor wafer with a base; and
    urging substantially an entire surface of the base by applying a single force to the base with a single pressure member to produce a substantially constant force against a process surface, wherein a spring constant of the process surface is greater than a spring constant of the pressure member.

14. The process of claim 13, wherein the process surface is a surface of a workpiece influencing device.

15. The method of claim 13, wherein the process surface is a surface of a polishing pad.

16. The method of claim 13, further comprising the step of providing relative motion between the base and the process surface.

17. The method of claim 13, further comprising the step of rotating the carrier head.

18. The method of claim 17, wherein the carrier head and the base rotate as a unit.

19. The method of claim 13, wherein the pressure member causes the base to apply a constant force against the process surface along a displacement axis against the process surface.

20. The method of claim 13, further comprising the step of limiting a range of motion along a displacement axis of the base against the process surface.

21. The method of claim 13, wherein the pressure member is a spring.

22. The method of claim 21, wherein the process surface is compressible.

23. The method of claim 13, wherein the pressure member is pneumatic.

24. An article of manufacture using the method of claim 13.

25. A method of processing a surface of a workpiece on a process surface while holding the workpiece with a carrier head comprising a base, comprising:
    contacting the surface of the workpiece to the process surface with a single constant pressure exerted across an entire surface of the base holding the workpiece by a single pressure member within the carrier head, wherein the carrier head is configured to move the surface of the workpiece along a displacement axis; and
    processing the surface of the workpiece with the process surface while maintaining the constant pressure, wherein a spring constant of the process surface is greater than a spring constant of the pressure member.

* * * * *